(12) United States Patent
Fujisawa et al.

(10) Patent No.: US 7,978,228 B2
(45) Date of Patent: Jul. 12, 2011

(54) IMAGE-CAPTURING APPARATUS AND IMAGE PROCESSING METHOD

(75) Inventors: Toshiki Fujisawa, Osaka (JP); Toru Shiono, Tokyo (JP); Hitoshi Yano, Osaka (JP); Shinichi Maehama, Osaka (JP); Akira Fukuda, Osaka (JP); Shinya Nara, Osaka (JP)

(73) Assignee: Sony Corporation, Tokyo (JP)

( * ) Notice: Subject to any disclaimer, the term of this patent is extended or adjusted under 35 U.S.C. 154(b) by 698 days.

(21) Appl. No.: 12/026,026

(22) Filed: Feb. 5, 2008

(65) Prior Publication Data

US 2008/0211931 A1    Sep. 4, 2008

(30) Foreign Application Priority Data

Mar. 2, 2007   (JP) .................................. 2007-052280

(51) Int. Cl.
*H04N 5/228*   (2006.01)
*H04N 9/73*   (2006.01)

(52) U.S. Cl. .................................. 348/222.1; 348/223.1

(58) Field of Classification Search ............... 348/222.1, 348/231.99, 663
See application file for complete search history.

(56) References Cited

U.S. PATENT DOCUMENTS

| 7,671,896 B2 * | 3/2010 | Kubo .......................... 348/222.1 |
| 7,755,669 B2 * | 7/2010 | Shiomi ....................... 348/222.1 |
| 7,768,565 B2 * | 8/2010 | Hibino ....................... 348/333.01 |
| 7,782,377 B2 * | 8/2010 | Miyanari et al. ............... 348/241 |
| 2005/0053131 A1 * | 3/2005 | Domke et al. ........... 375/240.01 |

FOREIGN PATENT DOCUMENTS

| JP | 2002-94934 | 3/2002 |
| JP | 2005-159995 | 6/2005 |

* cited by examiner

*Primary Examiner* — Jason Chan
*Assistant Examiner* — Pritham Prabhakher
(74) *Attorney, Agent, or Firm* — Oblon, Spivak, McClelland, Maier & Neustadt, L.L.P.

(57) ABSTRACT

An image-capturing apparatus includes an image-capturing unit configured to sequentially output image data in a RAW format related to each of captured images as a result of a continuous series of image capturing operations; a signal processor configured to perform a predetermined process on the image data in a RAW format and output processed image data; image processing circuits configured to perform a luminance/color-difference conversion process and a data compression process on the processed image data and output compressed image data; and a recording controller configured to cause compressed image data output from the image processing circuits to be recorded in a predetermined recorder. The signal processor includes a selection output unit configured to selectively output the processed image data related to each of the captured images to the image processing circuits and cause the image processing related to each captured image to be shared by the image processing circuits.

9 Claims, 10 Drawing Sheets

1A, 1B 1A, 1B

IMAGE-CAPTURING APPARATUS AND IMAGE PROCESSING METHOD

CROSS REFERENCES TO RELATED APPLICATIONS

The present invention contains subject matter related to Japanese Patent Application JP 2007-052280 filed in the Japanese Patent Office on Mar. 2, 2007, the entire contents of which are incorporated herein by reference.

BACKGROUND OF THE INVENTION

1. Field of the Invention

The present invention relates to a technology for an image-capturing apparatus capable of performing a continuous series of image capturing operations (continuous image capturing).

2. Description of the Related Art

In digital cameras (image-capturing apparatuses), with increases in the number of pixels included in an image-capturing sensor (imaging sensor), there has been a tendency that the processing performance of an image processing circuit that performs JPEG compression is insufficient. Here, if the processing performance of an image processing circuit becomes insufficient, it is difficult for a single-lens reflex digital camera demanding high-speed continuous image-capturing performance to realize a sufficient continuous image-capturing speed.

On the other hand, as a technology for improving processing performance in the above-described image processing circuit, there is a technology disclosed in, for example, Japanese Unexamined Patent Application Publication No. 2002-94934. According to this technology, processing operations are performed in parallel in such a manner that a control system bus used for processing of camera control and the like and an image processing system bus used for processing in a JPEG compression circuit (image processing circuit) are provided separate from each other, so that processing efficiency in the image processing circuit is improved.

SUMMARY OF THE INVENTION

However, in the technology of Japanese Unexamined Patent Application Publication No. 2002-94934, since only one image processing circuit is connected to the image processing system bus, it is difficult to start processing for the next image until the processing currently being performed in the image processing circuit is completed. As a result, it is difficult to set a continuous image-capturing speed shorter than the processing time in the image processing circuit in the continuous image capturing, and it is difficult to perform fast image processing on a series of captured images obtained by continuous image capturing. Therefore, it is difficult to realize the above-described high-speed continuous image-capturing performance.

The present invention has been made in view of the above-described problems. It is desirable to provide a technology for an image-capturing apparatus capable of performing high-speed image processing on a series of captured images obtained by continuous image capturing.

According to an embodiment of the present invention, there is provided an image-capturing apparatus including: image-capturing means for sequentially outputting image data in a RAW format related to each of captured images as a result of a continuous series of image capturing operations; signal processing means for performing a predetermined process on the image data in a RAW format and outputting processed image data; a plurality of image processing circuits for performing image processing including a luminance/color-difference conversion process and a data compression process on the processed image data and outputting compressed image data; and recording control means for causing compressed image data output from each of the plurality of image processing circuits to be recorded in predetermined recording means, wherein the signal processing means includes selection output means for selectively outputting the processed image data related to each of the captured images to the plurality of image processing circuits and for causing the image processing related to each of the captured images to be shared by the plurality of image processing circuits.

According to another embodiment of the present invention, there is provided an image processing method including the steps of: sequentially generating image data in a RAW format related to each of captured images as a result of a continuous series of image capturing operations; performing a predetermined process on the image data in a RAW format and generating processed image data related to each of the captured images; selectively inputting the processed image data related to each of the captured images to a plurality of image processing circuits and causing image processing related to each of the captured images to be shared among the plurality of image processing circuits; and performing image processing including a luminance/color-difference conversion process and a data compression process on the processed image data and generating compressed image data in an image processing circuit to which the processed image data has been input, wherein the compressed image data generated in the image processing is recorded in predetermined recording means.

According to the embodiments of the present invention, a predetermined process is performed on image data in a RAW format, which is sequentially output from the image-capturing means as a result of a continuous series of image capturing operations. The generated processed image data related to each captured image is selectively output to a plurality of image processing circuits. Image processing including a luminance/color-difference conversion process and a data compression process related to each captured image is shared among a plurality of image processing circuits. As a result, it is possible to perform fast image processing on a series of captured images obtained by the continuous image capturing.

DESCRIPTION OF THE PREFERRED EMBODIMENTS

First Embodiment

<Configuration of Exterior of Camera System>

Figure 1:
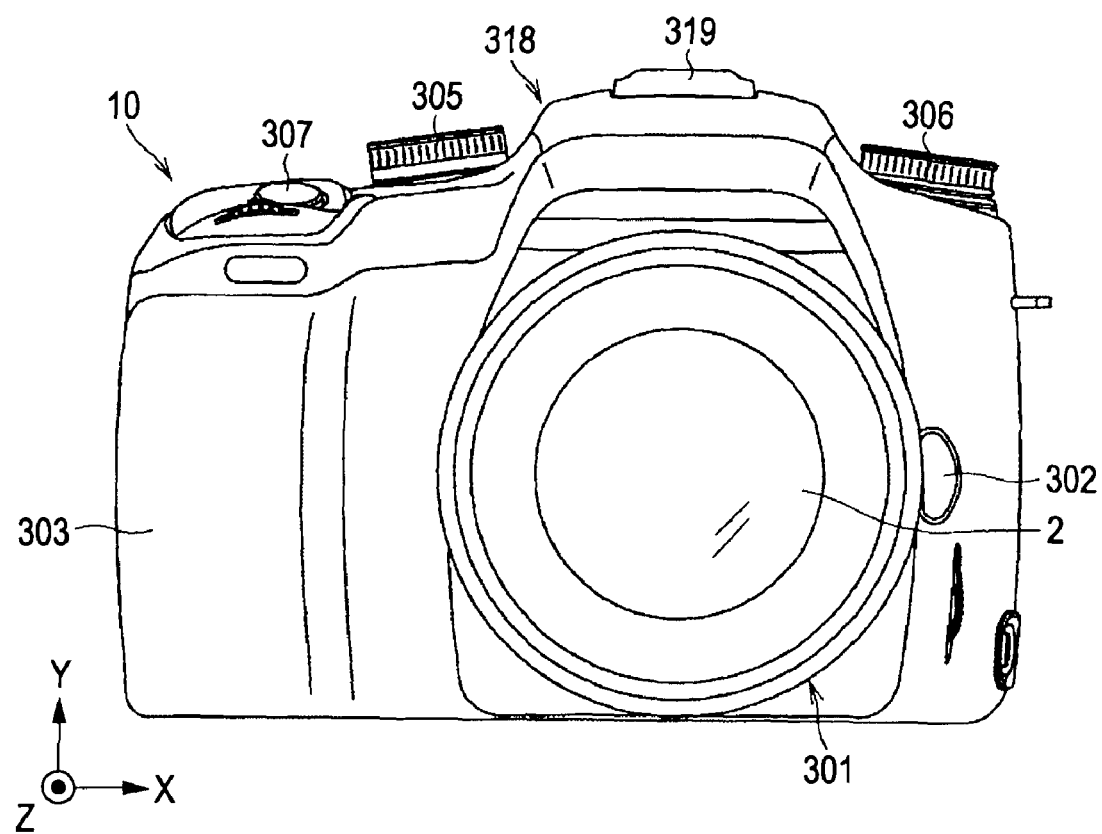
FIG. 1 shows the configuration of the exterior of a camera system 1A according to a first embodiment of the present invention.
Figure 2:
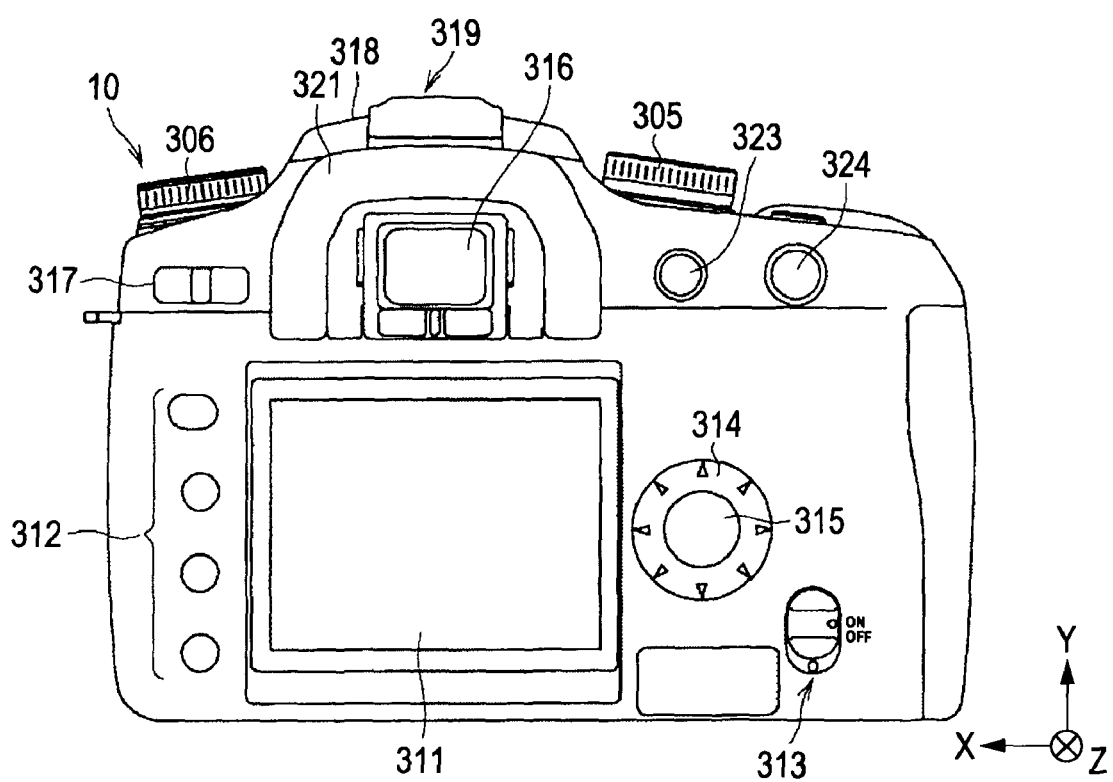
FIG. 2 shows the configuration of the exterior of the camera system 1A.

FIGS. 1 and 2 show the configuration of the exterior of a camera system 1A according to a first embodiment of the present invention. FIGS. 1 and 2 show a front view and a back view, respectively.

The camera system 1A functions as an image-capturing apparatus configured as, for example, a single-lens-reflex digital still camera, and includes a camera body 10, and an exchangeable lens 2 that can be loaded into and removed from the camera body 10.

In FIG. 1, on the front side of the camera body 10, there are provided a mount unit 301 in which an exchangeable lens 2 is installed in nearly the center of the front side, a lens exchange button 302 arranged on the right side of the mount unit 301, a grip part 303, which is protrusively provided in the left end portion of the front side (the left side in the X direction) and which can be reliably gripped by a user with one hand (or both hands), a mode setting dial 305 arranged in the left upper portion of the front side (the left upper portion in the Y direction), a control value setting dial 306 arranged in the right upper portion of the front side, and a shutter button 307 arranged on the top surface of the grip part 303.

In FIG. 2, on the back side of the camera body 10, there are provided an LCD (Liquid Crystal Display) 311, a setting button group 312 arranged to the left of the LCD 311, a cross-shaped key 314 arranged to the right of the LCD 311, a push button 315 arranged in the center of the cross-shaped key 314, and a camera-shake correction switch 313 arranged to the lower right of the cross-shaped key 314. Furthermore, on the back side of the camera body 10, there are provided an exposure correction button 323, an optical finder 316 disposed above the LCD 311, an AE lock button 324, the exposure correction button 323 and the AE lock button 324 being disposed to the right of the optical finder 316, a flash unit 318, and a connection terminal 319, the flash unit 318 and the connection terminal 319 being disposed above the optical finder 316.

The mount unit 301 is provided with a plurality of electrical contacts for making an electrical connection with the installed exchangeable lens 2, a coupler for making a mechanical connection, and the like.

The lens exchangeable button 302 is a button that is depressed when the exchangeable lens 2 mounted in the mount unit 301 is to be removed.

The grip part 303 is a part with which a user grips the camera system 1A at the time of image capturing and is provided with surface irregularities that fit the shape of a user's hand in order to provide good grip. Inside the grip part 303, a battery chamber and a card storage chamber (not shown) are provided. A battery 107 (FIG. 3) serving as a power supply for a camera is housed in the battery chamber. In the card storage chamber, a memory card such as a recording medium 9 (for example, a memory stick 91 (FIG. 3) or a compact flash (registered trademark) (FIG. 3) for recording image data of captured images is removably housed. The grip part 303 may be provided with a grip sensor for detecting whether or not the user is gripping the grip part 303.

The mode setting dial 305 and the control value setting dial 306 are each formed of an approximately disk-shaped member, which can be rotated in the plane that is approximately parallel to the top surface of the camera body 10. The mode setting dial 305 is used to selectively select functions and modes available in the camera system 1A, such as an automatic exposure (AE) control mode, an automatic focus (auto focus (AF)) control mode, various kinds of image capturing modes such as a still image capturing mode for capturing one still image and a continuous image capturing mode for performing continuous image capturing, and a reproduction mode for reproducing a recorded image. On the other hand, the control value setting dial 306 is used to set control values for various functions available in the camera system 1A.

The shutter button 307 is a depression switch with which an operation of a "half depressed state" in which the shutter button 307 is pushed in halfway and an operation of a "fully depressed state" in which the shutter button 307 is fully pushed in are made possible. When the shutter button 307 is half depressed (S1) in the still image capturing mode, a preparation operation (preparation operation, such as setting of an exposure control value, focus adjustment, and the like) for capturing a still image of a subject is performed. When the shutter button 307 is fully depressed (S2), image capturing operations (a series of operations including exposing an image-capturing sensor, performing predetermined image processing on the image signal obtained by the exposure, and recording the image signal in a memory card or the like are performed.

The LCD 311 includes a color liquid-crystal panel capable of displaying an image, displays an image captured by an image-capturing sensor (imaging element) 151 (FIG. 3), reproduces and displays a recorded image, and displays a setting screen for setting functions and modes available in the camera system 1A. In place of the LCD 311, an organic EL or plasma display apparatus may be used.

The setting button group 312 includes buttons for operating various kinds of functions available in the camera system 1A. The setting button group 312 includes, for example, a selection setting switch for setting content selected on the menu screen displayed on the LCD 311, a selection cancel switch, a menu display switch for changing the content of the menu screen, a display on/off switch, a display expansion switch, and the like.

The camera-shake correction switch 313 is a button for supplying an operation signal used to perform a camera-shake correction operation. The camera-shake correction switch 313 is operated by the user when there is a risk that an influence of "shaking", such as camera shake, will appear in the captured image at the time of hand-held image capturing, telephoto image capturing, image capturing in a dark environment, or image capturing necessitating exposure for a long time, and is used to set to a state in which a camera-shake correction operation of the camera body 10 can be performed.

A cross-shaped key 314 has a ring-shaped member including a plurality of depressable parts (parts represented by triangular marks in FIG. 2) arranged at fixed intervals in the circumferential direction, and is configured in such a manner that a depressing operation of any of the depressable parts is detected by contacts (switches) (not shown) provided so as to correspond to the depressable parts. Furthermore, the push button 315 is placed in the center of the cross-shaped key 314. The cross-shaped key 314 and the push button 315 are used to input instructions for setting of changing an image capturing magnification (movement to the wide angle direction or to the telephoto angle direction of the zoom lens), frame-by-frame advance of a recorded image to be reproduced on the LCD 311 or the like, and image capturing conditions (aperture value, shutter speed, presence or absence of flash light emission, etc.).

The optical finder 316 optically displays a range in which the image of a subject is to be captured. That is, a subject image from the exchangeable lens 2 is guided to the optical finder 316, and the user can visually recognize the image of a subject that is to be actually captured by an image-capturing sensor 151 of an image-capturing unit 15 by looking into the optical finder 316.

A main switch 317 is formed of a slide switch of two contacts that slide to the left and right. When the main switch 317 is set to the left, the power supply of the camera system 1A is switched on, and when the main switch 317 is set to the right, the power supply of the camera system 1A is switched off.

The flash unit 318 is configured as a pop-up type built-in flash. On the other hand, when an external flash or the like is mounted in the camera body 10, the external flash is connected using a connection terminal 319.

An eye cup 321 has light-shielding characteristics and is a light-shielding member having a U-shaped cross section for suppressing entry of external light into an EVF 316.

The exposure correction button 323 is a button for manually adjusting an exposure value (an aperture value, and a shutter speed), and the AE lock button 324 is a button for fixing exposure.

The exchangeable lens 2 functions as a lens window that receives light (optical image) from a subject and also functions as an image-capturing optical system for guiding the subject light to the image-capturing sensor arranged inside the camera body 10. The exchangeable lens 2 can be removed from the camera body 10 by depressing the lens exchangeable button 302.

The exchangeable lens 2 includes a lens group formed of a plurality of lenses arranged in a serial manner along the light axis of the exchangeable lens 2. The lens group includes a focus lens for adjusting the focus and a zoom lens for performing variable magnification. As a result of them being driven in the direction of the light axis, variable magnification and focus adjustment are performed, respectively. Furthermore, at an appropriate place on the outer circumference of the lens barrel, the exchangeable lens 2 includes an operation ring that is rotatable along the outer peripheral surface of the lens barrel. The zoom lens is moved in the light axis direction in accordance with the rotation direction and the amount of rotation of the operation ring by a manual operation or an auto operation, and is set at a zoom magnification (image capturing magnification) in proportion to the position of the movement destination.

<Electrical Configuration of Camera System 1A>

Figure 3:
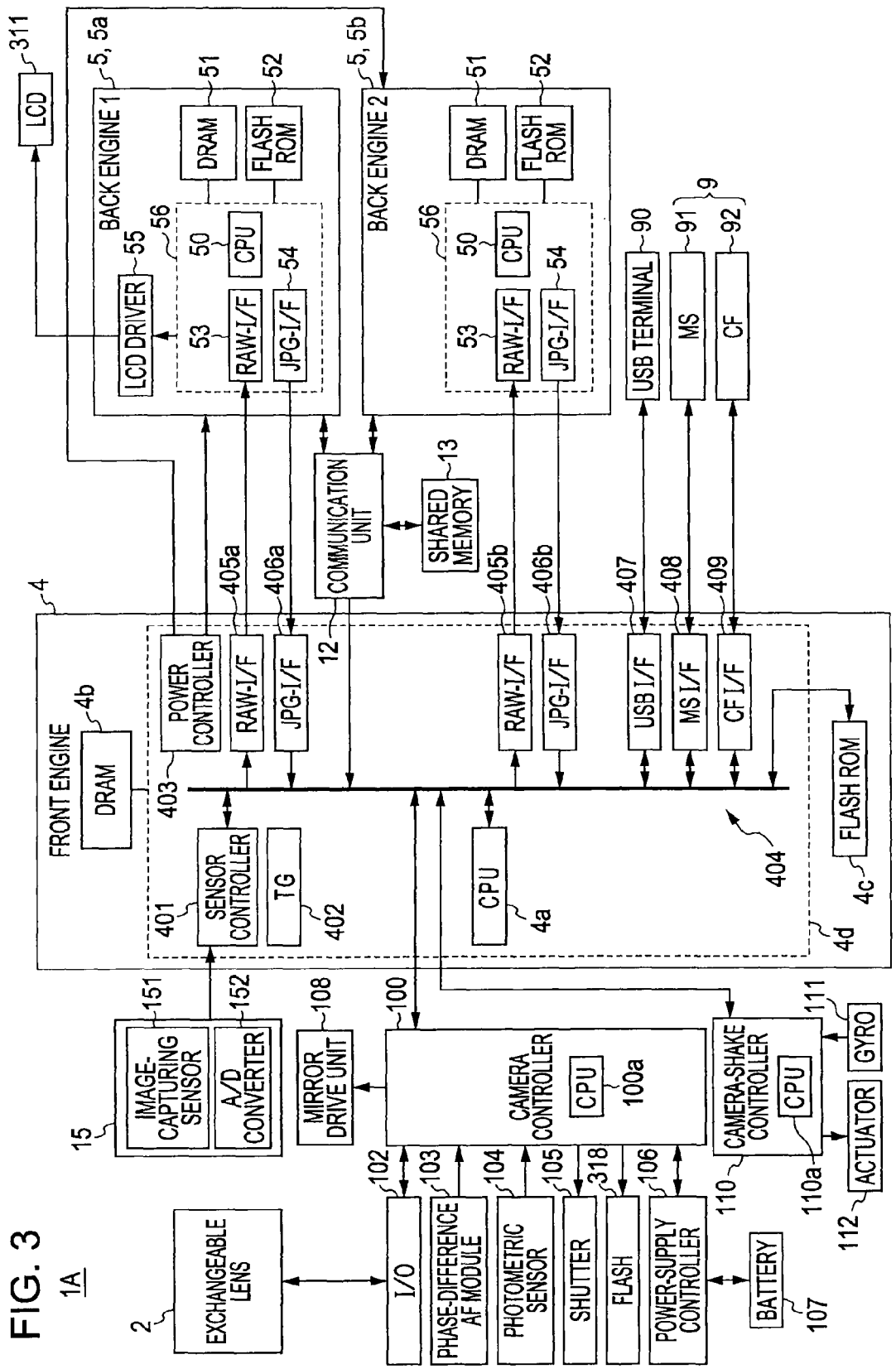
FIG. 3 is a block diagram showing the electrical configuration of the camera system 1A.

FIG. 3 is a block diagram showing the electrical configuration of the camera system 1A. Components in FIG. 3, which are identical to those components shown in FIGS. 1 and 2, are designated with the same reference numerals.

The camera system 1A includes a camera controller 100 in charge of control (camera control) of a camera mechanism for the camera system 1A, a front engine 4 for performing processing, such as correction, on an image signal generated by the image-capturing unit 15, and two back-end engines (hereinafter will be abbreviated as "back engines") 5 (5a, 5b) as an image processing engine for performing image processing on the image data processed by the front engine 4. Furthermore, the camera system 1A has a communication unit 12 capable of performing communication with the front engine 4 and the back engines 5a and 5b, and a shared memory 13, which is formed as, for example, a RAM, for storing shared data (information on a correction parameter (to be described later)) transferred from the back engines 5a and 5b via the communication unit 12.

The camera controller 100 is a unit, which has a CPU (Central Processing Unit) 100a, for performing control at the time of an image-capturing operation in the camera system 1A. In the camera controller 100, control (for example, driving control of a focus lens) of each unit inside the exchangeable lens 2 via the I/O unit 102 is possible, and on the basis of the output signal output from the phase difference AF module 103, a focus lens inside the exchangeable lens 2 is driven to perform auto focus (AF). Furthermore, the camera controller 100 performs exposure control (AE control) on the basis of the output signal from a photometric sensor 104.

Furthermore, the camera controller 100 performs driving control for a shutter 105, light-emission control of the flash 318, and control of driving mirrors inside the camera body 10 via a mirror drive unit 108 and also, performs the power supply control for supplying electric power to each unit of the camera system 1A from the battery 107 housed in the battery chamber inside the grip part 303 by using the power-supply controller 106.

The camera shake controller 110 has a CPU 110a and is a unit for performing control of a camera-shake correction operation. In the camera shake controller 110, on the basis of the output signal from a gyro sensor 111 for camera-shake correction, the amount of camera shake is computed, and on the basis of the amount of the computed camera shake, an actuator 112 for moving the image-capturing sensor 151 in a direction perpendicular to the light axis of the exchangeable lens 2 is driven.

The image-capturing unit 15 includes an image-capturing sensor 151 and an A/D converter 152 for converting an analog signal output from the image-capturing sensor 151 into a digital signal. It is possible for the image-capturing unit 15 to sequentially output image data in a RAW format (hereinafter will also be referred to as "RAW image data" related to each captured image by a continuous series of image capturing, for example, continuous image capturing.

The image-capturing sensor 151 is arranged in a direction perpendicular to the light axis of the lens group provided in the exchangeable lens 2 when the exchangeable lens 2 is installed into the camera body 10. As the image-capturing sensor, for example, a Bayer pattern CMOS color area sensor (CMOS type image sensor) in which, for example, a plurality of pixels configured to have photodiodes are arranged two-dimensionally in a matrix form and, for example, color filters of R (red), G (green), and B (blue) having mutually different spectral characteristic are disposed at a ratio of 1:2:1, is used. In such an image-capturing sensor 151, an analog electrical signal (image signal) of each color component of R (red), G (green), and B (blue) for a subject optical image formed as an image after passing through the exchangeable lens 2 is generated, and an image signal of each of R, G, and B colors is output. That is, an image signal in a RAW format (hereinafter will also be referred to simply as a "RAW image signal") formed of a pixel signal of each of the RGB colors arranged at the above-described Bayer pattern is output from the image-capturing sensor 151.

The front engine 4 includes a CPU 4a functioning as a microcomputer, a DRAM 4b, and a flash ROM 4c. RAW image data is stored in the DRAM 4b and, for example, a program for control purposes is stored in the flash ROM 4c. In the front engine 4, driving of the image-capturing sensor 151 is controlled by the sensor controller 401 and also, peripheral decreased light correction (shading correction) for images and correction of variations in the signal level of each pixel are performed on RAW image data output from the image-capturing unit 15. In the sensor controller 401, since correction parameters for exposure and white balance are computed, a reduced image in which the resolution of the RAW image data from the image-capturing unit 15 is reduced is generated. The front engine 4 is configured in such a manner that a portion (within the broken line) excluding the DRAM 4b and the flash ROM 4c is a processing unit 4d for performing various kinds of processing.

The front engine 4 includes a timing generator (TG) 402, an electric power controller 403, and an interface unit 404 for performing input/output with the outside of the front engine 4.

The timing generator 402 is a unit for calculating a timing, such as the start (and completion) of an exposure operation for the image-capturing sensor 151.

The electric power controller 403 controls switching on/off of the power supply for each back engine 5. Then, the electric power controller 403 causes power to be supplied to each of the two back engines 5a and 5b when image processing (YCC conversion and JPEG conversion processes (to be described later)) by the back engine 5 to be started and also, switches off the power supply when image processing is completed. As a result, the consumption of power can be reduced.

The interface (I/F) unit 404 includes two RAW I/Fs 405a and 405b for outputting RAW image data that has been subjected to a correction process inside the front engine 4 to the back engines 5a and 5b, and JPG I/Fs 406a and 406b for inputting image data on which image processing, such as JPEG compression, has been performed by the back engines 5a and 5b.

The interface unit 404 has a USB I/F 407 via which image data or the like is output from a USB terminal 90 provided in the camera body 10 to the outside, and an MS I/F 408 and a CF I/F 409 via which image data or the like is input to or output from a memory stick (MS) 91 and a compact flash (registered trademark) (CF) 92, which are housed in the card storage chamber inside the grip part 303, respectively.

The back engine 5 (5a, 5b) is configured as an image processing circuit including a CPU 50 functioning as a microcomputer, a DRAM 51, and a flash ROM 52. Image data and the like are stored in the DRAM 51 and also, for example, a program for control purposes is stored in the flash ROM 52. In the back engine 5 having the CPU 50 in the manner described above, functions are improved in comparison with a simple hardware engine exclusively used for image processing (to be described in detail later). In the back engine 5, a part excluding the DRAM 51 and the flash ROM 52 (within the broken line) is configured as a processing unit 56 for performing various kinds of processing, such as image processing.

The back engine 5 has a RAW I/F 53 via which correction-processed RAW image data output from the RAW I/Fs 405a and 405b of the front engine 4 is input, and a JPG I/F 54 via which image data generated by performing a development process and a JPEG compression process on the correction-processed RAW image data is output to the JPG I/Fs 406a and 406b of the front engine 5.

The back engine 5a has an LCD driver 55 for driving the LCD 311, and enables the LCD 311 to output a captured image by using the CPU 50 via the LCD driver 55. In the back engine 5a having an image display function for the LCD 311 in the manner described above, there is no need to transfer image data on which a development process has been performed to another unit (for example, the front engine 4) having an image display function and to display the image and therefore, an image display, such as a quick afterview display, can be performed. As a result, in the camera system 1A, an image display at a speed higher than that in a system including a simple hardware engine exclusively used for image processing is made possible.

Processing at the time of continuous image capturing by the camera system 1A having the above-described configuration will be described below.

<Processing at the Time of Continuous Image Capturing>

Figure 4:
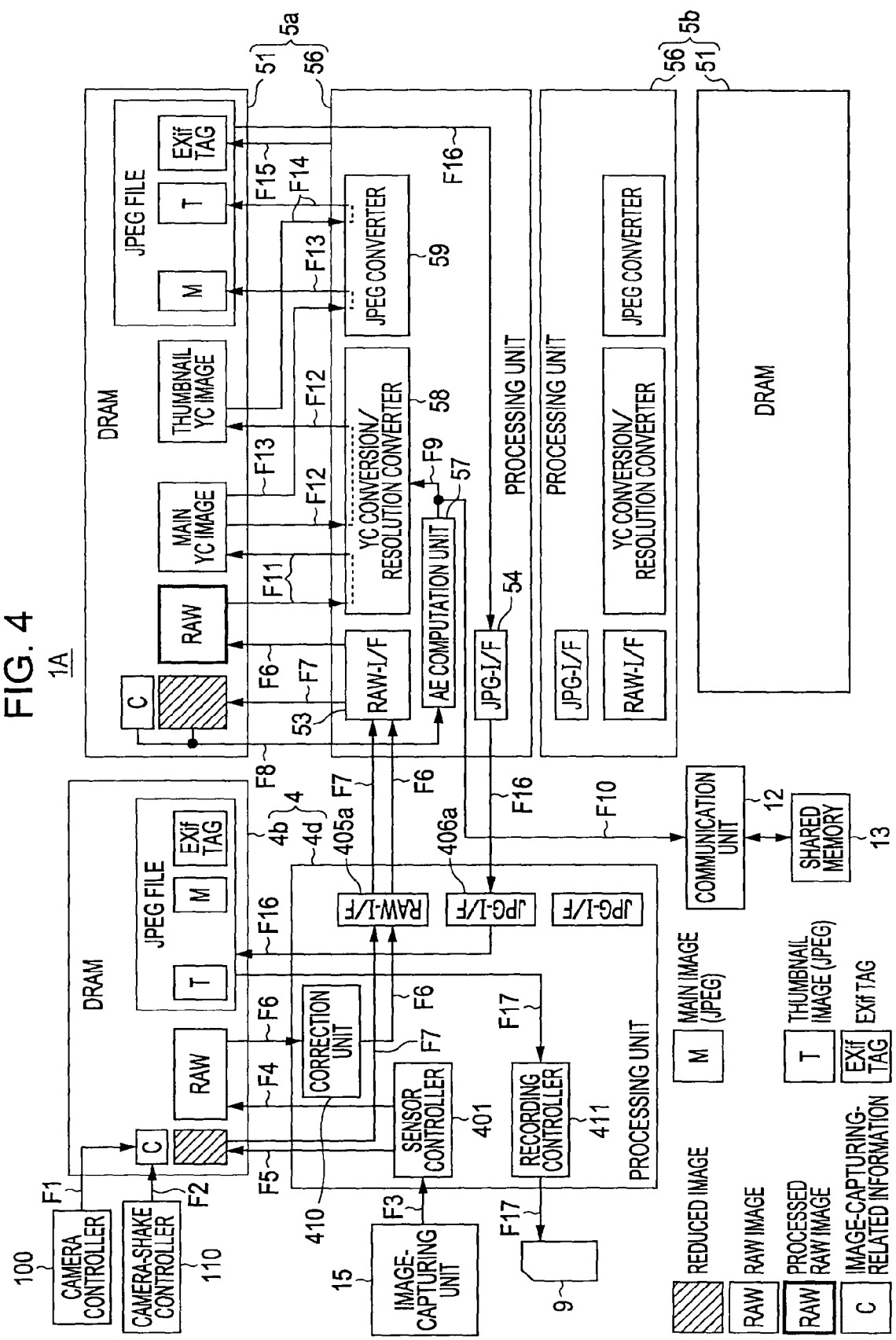
FIG. 4 illustrates processing at the time of continuous image capturing in the camera system 1A.
Figure 5:
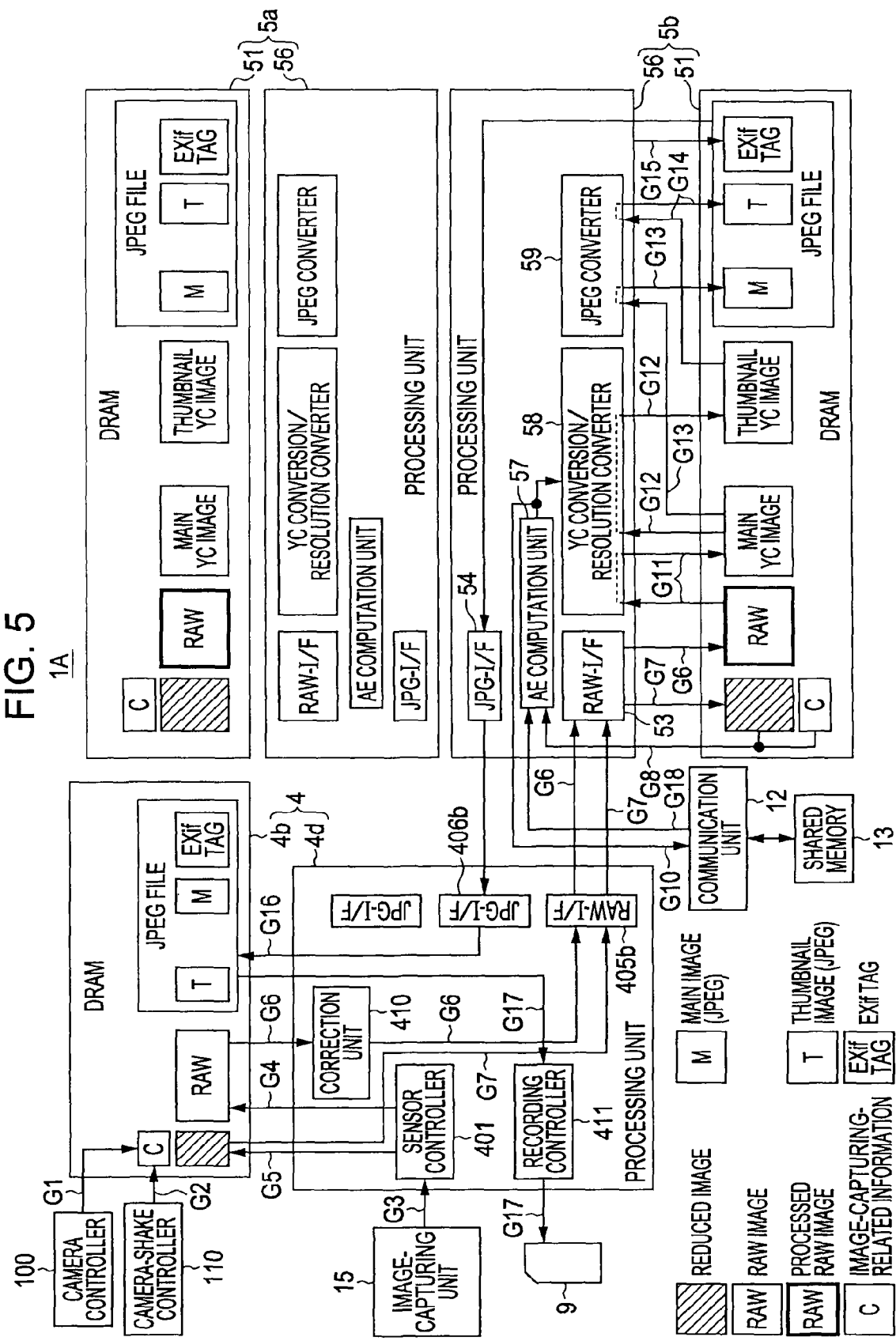
FIG. 5 illustrates processing at the time of continuous image capturing in the camera system 1A.

FIGS. 4 and 5 are illustrations of processing performed at the time of continuous image capturing by the camera system 1A. FIG. 4 shows a state in which a first (odd-numbered) captured image at the time of continuous image capturing is processed. FIG. 5 shows a state in which a second (even-numbered) captured image is processed. In FIGS. 4 and 5, the flow of data is indicated by a thick-line arrow mark.

First, referring to FIG. 4, each processing operation performed at the time of capturing a first image in continuous image capturing will be described in sequence along the flow of data.

(1) Flows F1 and F2

First, image capturing information, such as an aperture value, a shutter speed, an image-capturing date and time, and the like, is transferred from the camera controller 100 to the DRAM 4b of the front engine 4. Similarly, camera shake data on camera-shake correction is transferred from the camera shake controller 110 to the DRAM 4b. In the following, the image capturing information and the camera shake data stored in the DRAM 4b will also be referred to as image-capturing-related information.

(2) Flows F3 to F5

First, RAW image data output from the image-capturing unit 15 is transferred to the DRAM 4b of the front engine 4 via the sensor controller 401. At this point, a reduced image having a reduced resolution compared with that of a RAW image input from the image-capturing unit 15 is generated by the image-capturing unit controller 401, and is stored in the DRAM 4b.

(3) Flow F6

RAW image data stored in the DRAM 4b of the front engine 4 is transferred to the DRAM 51 of the back engine 5a via the RAW I/F 405a of the front engine 4 and the RAW I/F 53 of the back engine 5a. At this time, a correction unit 410 of the front engine 4 performs preprocessing for a YCC conversion process (to be described later) on RAW image data inside the DRAM 4b, more specifically, shading correction and defect pixel correction. The RAW image data on which these corrections have been performed (hereinafter will also be referred to as "correction-processed RAW image data") is output from the front engine 4 and also, the correction-processed RAW image data is input to the back engine 5a via the RAW I/F 53. In the correction unit 410, luminance correction among channels with regard to the image-capturing sensor 151 may be performed.

(4) Flow F7

A reduced image and image-capturing-related information stored in the DRAM 4b of the front engine 4 are transferred to the DRAM 51 of the back engine 5a via the RAW I/F 405a of the front engine 4 and the RAW I/F 53 of the back engine 5a.

(5) Flows F8 to F10

The reduced image and the image-capturing-related information stored in the DRAM 51 of the back engine 5a are transmitted to an AE computation unit 57, and on the basis of the reduced image and the image-capturing-related information, the AE computation unit 57 of the processing unit 56 computes correction parameters (for example, setting information on a γ curve, a WB gain, etc.) used for exposure correction (AE correction) and white-balance (WB) correction using, for example, a γ curve. That is, on the basis of the reduced image (image information) for one captured image that is output from the front engine 4 and that is input to the RAW I/F 53, the AE computation unit 57 obtains information on the correction parameters. Then, the correction parameters computed by the AE computation unit 57 are transmitted to a YC conversion/resolution converter 58 and also they are stored in the shared memory 13 via the communication unit 12. As a result, it is possible to transmit information on the correction parameters from the back engine 5a to another back engine 5b via the shared memory 13.

(6) Flow F11

The YC conversion/resolution converter 58 inside the processing unit 56 performs YCrCb (YCC) conversion as a luminance/color-difference conversion process for converting a digital RGB signal into a digital luminance signal and color-difference signals on the correction-processed RAW image data stored in the DPAM 51 of the back engine 5a, thereby generating YCC data of a main image (hereinafter will also be referred to as a "main YC image"), and the main YC image is stored in the DRAM 51. In the YC conversion/resolution converter 58, a YCC conversion process (image processing), and correction processes (image processing) for performing exposure correction and white-balance correction are performed on the basis of the information on the correction parameters computed by the AE computation unit 57.

(7) Flow F12

The YC conversion/resolution converter 58 inside the processing unit 56 performs resolution conversion on the main YC image stored in the DRAM 51 of the back engine 5a in order to generate YCC data of a thumbnail image (hereinafter also referred to as a "thumbnail YC image") used in the Exif data part of a JPEG file, and the thumbnail YC image is stored in the DRAM 51.

(8) Flow F13

A JPEG converter 59 of the processing unit 56 performs a process for converting a main YC image stored in the DRAM 51 of the back engine 5a into JPEG data, thereby generating a data-compressed main image, and stores the data-compressed main image in the DRAM 51.

(9) Flow F14

The JPEG converter 59 of the processing unit 56 performs a process for converting a thumbnail YC image stored in the DRAM 51 of the back engine 5a into JPEG data in order to generate a data-compressed thumbnail image, and causes the data-compressed thumbnail image to be stored in the DRAM 51.

(10) Flow F15

On the basis of the image-capturing-related information stored in the DRAM 51 of the back engine 5a, in the processing unit 56, data of an Exif tag of a JPEG file is created. Here, since Exif tag information, that is, header information attached to compressed image data in a JPEG format, is generated by using the CPU 50 (FIG. 3) of the back engine 5a, it is possible for the back engine 5 to appropriately create header information, which has been difficult for a simple hardware engine exclusively used for image processing.

As a result of the above processing, the main image, the thumbnail image, and the Exif tag information that have been subjected to a JPEG compression process are stored in the DRAM 51 of the back engine 5a, and thus generation of data (information) necessary for forming a JPEG file image is completed.

(11) Flow F16

The JPEG file image (the JPEG-converted main image, thumbnail image, and Exif tag information) stored in the DRAM 51 of the back engine 5a is transferred to the DRAM 4b of the front engine 4 via the JPG I/F 54 of the back engine 5a and the JPG I/F 406a of the front engine 4.

That is, in the back engine 5, image processing including a YCC conversion process performed by the YC conversion/resolution converter 58, that is, a luminance/color-difference conversion process, and a data compression process performed by the JPEG converter 59, is performed, and compressed image data in a JPEG format is output to the front engine 4.

(12) Flow F17

The JPEG file image stored in the DRAM 4b of the front engine 4 is recorded on the recording medium 9 by the recording controller 411 of the processing unit 4d. That is, the compressed image data in a JPEG format, which is output from each of the two back engines 5a and 5b, is recorded on the recording medium 9 by the recording controller 411.

Next, a description will be given, with reference to FIG. 5, of each processing operation performed at the time of capturing a second (even-numbered) image in continuous image capturing.

In the second image-capturing operation in continuous image capturing, a process similar to the first image-capturing operation is performed. More specifically, in each of flows G1 to G17, processing identical to the respective flows F1 to F17 in FIG. 4 is performed, whereas a flow G18 is added to FIG. 4. Processing for the flow G18 will be described below.

Flow G18

When the AE computation unit 57 of the processing unit 56 in the back engine 5b computes the correction parameter described above, a correction parameter is computed on the basis of, in addition to the reduced image and the image-capturing-related information stored in the DRAM 51, the correction parameter for a previous image that is stored in the shared memory 13. That is, information on the correction parameter is obtained on the basis of the information on the correction parameter based on the previously captured image ((N−1)th captured image), which was obtained by the image capturing operation previous to the image capturing operation of the current captured image (N-th captured image in the continuous image capturing) that is output from the front engine 4 and that is input to the back engine 5b, the information on the correction parameter being transferred from another back engine 5a via the shared memory 13, and on the basis of a reduced image (image information) for the N-th captured image. The reason why the correction parameter obtained from the previously captured image is considered is that, since the user may feel annoyance when luminance or the like of the image to be corrected differs markedly from that of the previous image in exposure correction and white-balance correction at the time of continuous image capturing, it is necessary for the AE computation unit 57 to compute an appropriate correction parameter matching the correction parameter obtained from the previous image. Here, in the camera system 1A, since the correction parameter for the previous image is computed by another back engine 5, the correction parameter related to the previous image is stored in the shared memory 13 that can be referred to by both the back engines 5a and 5b.

As has been described above, in the camera system 1A, image processing for capturing a first (odd-numbered) image and image processing for capturing a second (even-numbered) image in continuous image capturing are alternately performed by separate back engines 5a and 5b, and thus the continuous image-capturing speed can be improved. Specific operations at the time of continuous image capturing in such a camera system 1A will be described below.

<Operations of Camera System 1A>

Figure 6:
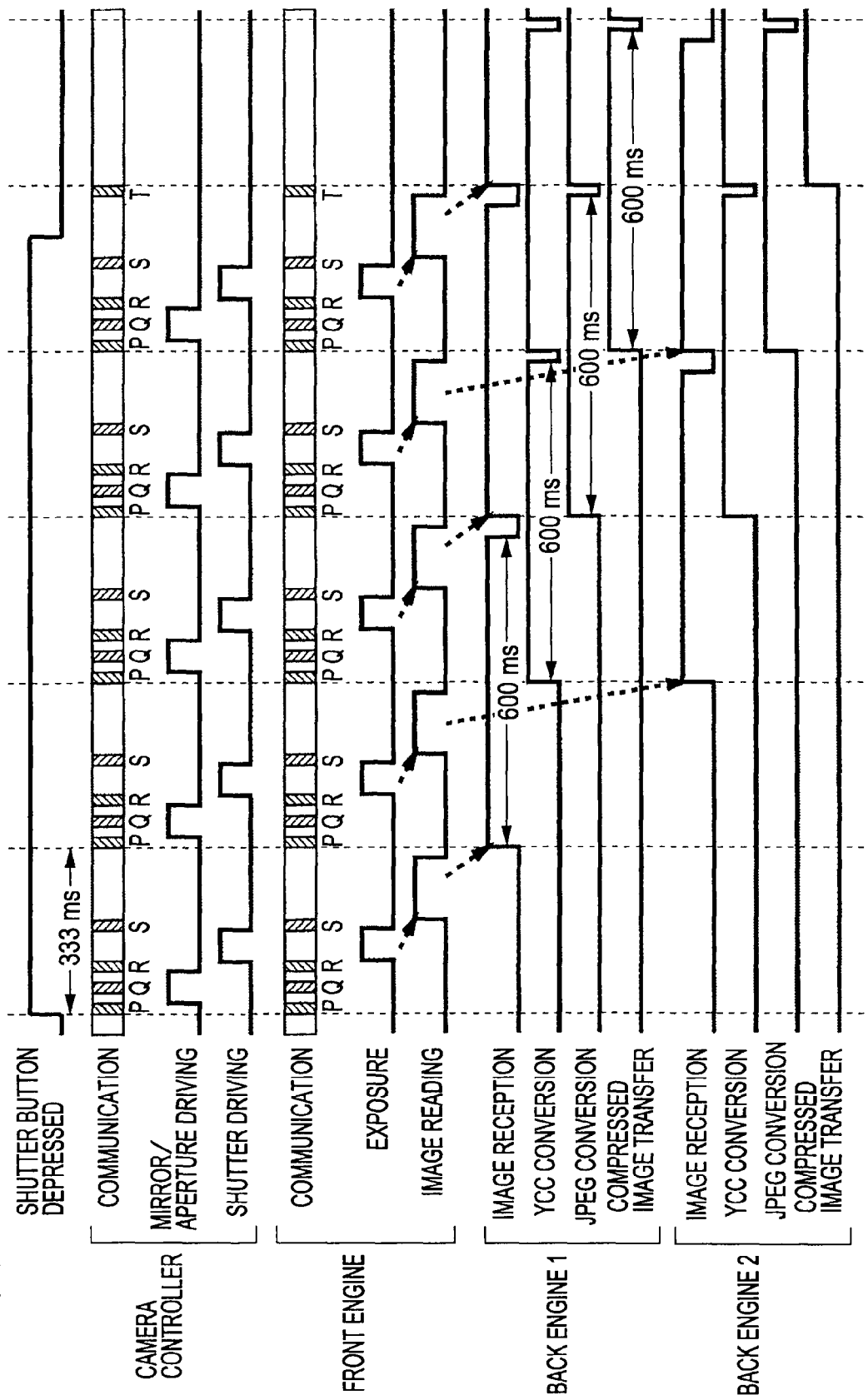
FIG. 6 illustrates basic operations at the time of continuous image capturing in the camera system 1A.

FIG. 6 illustrates basic operations at the time of continuous image capturing in the camera system 1A. FIG. 6 shows operations when five captured images are obtained as a result of the shutter button 307 being depressed for a predetermined time at the time of continuous image capturing for 3 frames per second.

Referring to FIG. 6, operations of the camera system 1A at the time of continuously capturing first to fifth images will be described below in sequence.

(i) Capturing of First Image

When the shutter button 307 is depressed, first, the electric power controller 403 allows the front engine 4 to switch on the power supply of the back-end engine 5a. Then, the front engine 4 performs communication P for starting to capture a first image with the camera controller 100.

Next, the camera controller 100 allows the mirror drive unit 108 to drive mirrors inside the camera body 10 and also drives the aperture inside the exchangeable lens 2. Then, image capturing information, such as the aperture and the shutter speed, is transmitted from the camera controller 100 to the front engine 4 in response to communication Q of the image capturing information.

Next, the front engine 4 performs communication R of starting exposure with the camera controller 100, thereby driving the shutter 105 so that exposure of the image-capturing sensor 151 is started. Then, by performing communication S of completing exposure, the exposure of the image-capturing sensor 151 is completed.

When the exposure is completed in response to the exposure completion communication S in the capturing of a first image, the front engine 4 reads a RAW image signal from the image-capturing sensor 151. When the image reading is completed, the read RAW image data is transferred to the back engine 5a.

Next, when the back engine 5a receives half of the RAW image data, a YCC conversion by the YC conversion/resolution converter 58 is started and also, the compressed image data that is data-compressed by JPEG conversion by the JPEG converter 59 and by the JPEG conversion is sequentially transferred to the front engine 4.

(ii) Capturing of Second Image

The front engine 4 causes the electric power controller 403 to switch on the power supply of the back engine 5b. Then, the front engine 4 performs communication P of starting to capture a second image with the camera controller 100.

Next, the front engine 4 causes the camera controller 100 to drive mirrors and the aperture in response to the communications Q to S similarly to the capturing of the first image and also, causes the shutter 105 to be driven to perform exposure of the image-capturing sensor 151.

When the exposure is completed in the capturing of the second image, the front engine 4 reads a RAW image signal from the image-capturing sensor 151. When the reading of the image is completed, the read RAW image data is transferred to the back engine 5b.

Next, when half of the RAW image data is received, the back engine 5b starts a YCC conversion by the YC conversion/resolution converter 58. Also, a JPEG conversion by the JPEG converter 59, and the transfer of the compressed image data that is data-compressed by the JPEG conversion to the front engine 4 are sequentially performed.

(iii) Capturing of Third to Fifth Images

In the capturing of the third and fifth images, which are odd-numbered images, an operation similarly to the first image capturing is performed and also, in the capturing of the fourth image, which is an even-numbered image, an operation similar to that of the second image is performed. In the capturing of the fifth image, which is the final image capturing, the front engine 4 performs image-capturing completion communication T to the camera controller 100, and thus the image-capturing operation by the camera controller 100 is completed.

As a result of the above processing, even when the processing time for the YCC conversion and the JPEG conversion needs to take approximately 600 ms, it is possible to realize a continuous image-capturing speed of 333 ms (3 frames per second) shorter than the processing time of 600 ms. The higher speed of the continuous image-capturing speed will be described below briefly with reference to FIG. 7.

Figure 7:
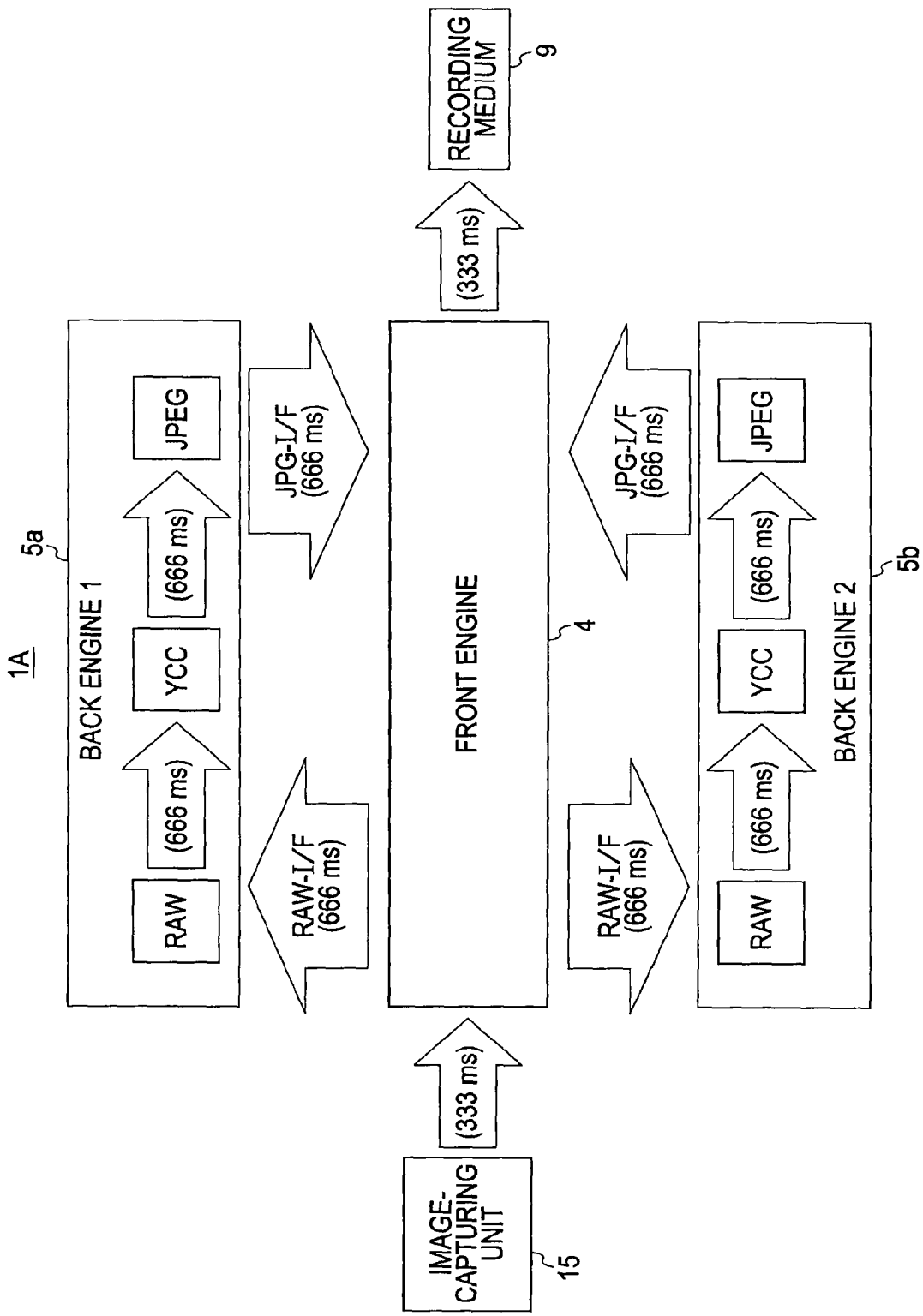
FIG. 7 illustrates operations of the camera system 1A at the time of continuous image capturing for 3 frames per second.

FIG. 7 illustrates the operation of the camera system 1A at the time of continuous image capturing for 3 frames per second.

When continuous image capturing for 3 frames per second is to be performed in the camera system 1A, RAW image data is sequentially input from the image-capturing unit 15 to the front engine 4 at time intervals of approximately 333 ms. Then, in the front engine 4, shading correction and the like are performed on the RAW image data input from the image-capturing unit 15, and the correction-processed RAW image data is alternately transferred to each of the back engines 5a and 5b with the RAW image data being separated into an odd-numbered image and an even-numbered image. In the back engines 5a and 5b to which the correction-processed RAW image data has been transferred, a YCC conversion and a JPEG conversion are performed and also, the image data that is data-compressed by the JPEG conversion (compressed image data) is returned again to the front engine 4. In the front engine 4 receiving the compressed image data, a process for recording images in sequence on the recording medium 9 at time intervals of approximately 333 ms is performed.

In the manner described above, in the front engine 4, the correction-processed image data related to each captured image is selectively output to the two back engines 5a and 5b, so that image processing (YCC conversion and JPEG conversion processes) for each captured image is shared by the two back engines 5a and 5b. As a result, it is possible for each of the back engines 5a and 5b to perform a YCC conversion and a JPEG conversion by taking a processing time of 666 ms, which is two times the continuous image-capturing speed of 333 ms. That is, in principle, it is possible to achieve a higher continuous image-capturing speed on the basis of the number of back engines 5.

In the camera system 1A described above, compressed image data that has been image-processed and generated by each back engine 5 is sequentially recorded on the recording medium 9. The sequential order of the image recording needs to match the sequential order of the image capturing. Here, in the camera system 1A, since processing for each image is shared by the two back engines 5, when the processing time of the back engine 5 differs among the images (for example, when JPEG conversion time becomes long or short depending on the difference in the quality or the like of the image), there is a possibility that the image captured earlier is transferred by the front engine 4 at a time later than that of the image captured later. In such a case, when the compressed image data is recorded on the recording medium 9 in the order in which the compressed image data is transferred to the front engine 4, the compressed image data is not recorded in the order of image capturing.

Accordingly, in order to eliminate such an inconvenience, in the camera system 1A, information on the image capturing order is attached to each captured image obtained by the continuous image capturing. This will be described in detail.

Figure 8:
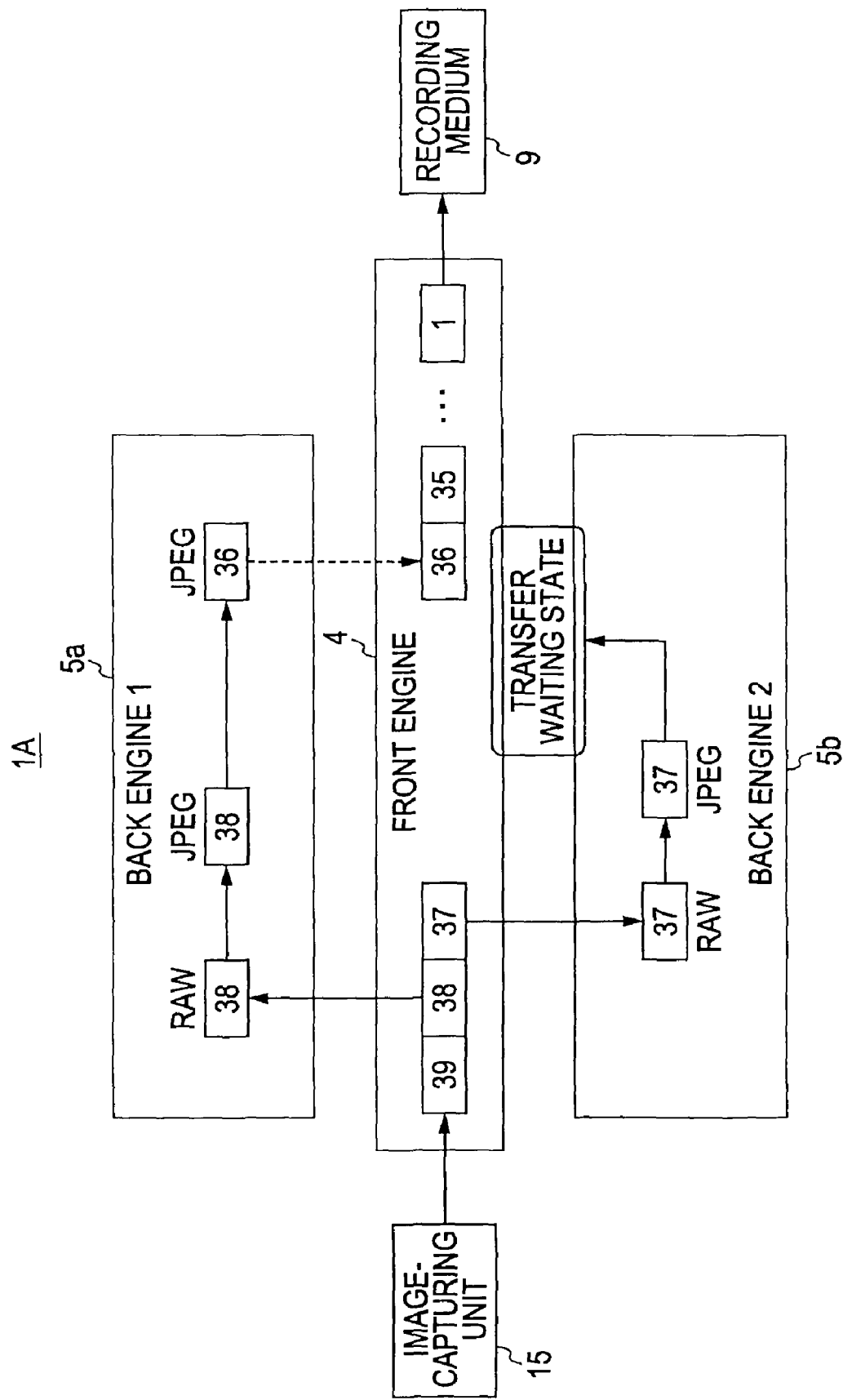
FIG. 8 illustrates processing for recording on a recording medium 9 on the basis of information on an image capturing order attached to each image.

FIG. 8 illustrates a process for recording on the recording medium 9 on the basis of information on the image capturing order attached to each captured image. FIG. 8 shows a state in which 39 images are obtained.

At first, for example, numerical value information on consecutive numbers (numbers 1 to 39 in FIG. 8) indicating the image capturing order obtained by the camera controller 100 is transferred from the front engine 4 to each back engine 5 with the numbers being attached to the correction-processed RAW image data. That is, numbers (identification information) 1 to 39 for identifying the image capturing order for each captured image are assigned to corresponding captured images, and the numbers, together with the correction-processed image data related to each captured image, are selectively output to the two back engines 5a and 5b.

Next, the back engines 5a and 5b transfer the compressed image data in a JEPG format in the image capturing order to the front engine 4 by referring to the information on the image capturing order attached to each captured image. For example, as shown in FIG. 8, when the completion of the processing of the 37th captured image data in the back engine 5b is earlier than the completion of the processing of the 36th captured image data in the back engine 5a, for example, under the instruction from the recording controller 411 of the front engine 4, the 37th captured image data is not transferred from the back engine 5b to the front engine 4 until the processing of the 36th captured image data and the transfer thereof to the front engine 4 in the back engine 5a are completed.

As described above, if the compressed image data related to each captured image that has been image-processed and generated by the back engines 5a and 5b is recorded in the image capturing order on the basis of the information on the image capturing order assigned to each captured image, even when image processing is performed in parallel by a plurality of back engines 5, it is possible to record the compressed image data on the recording medium 9 in a correct order (image capturing order).

As a result of the above-described operation of the camera system 1A, the correction unit 410 of the front engine 4 performs the correction process (preprocessing) on the RAW image data from the image-capturing unit 15. The correction-processed RAW image data is selectively output to the separate back engines 5a and 5b with the RAW image data being separated into the odd-numbered captured image and the even-numbered captured image by the back engines 5a and 5b so that image processing is shared between the back engines 5a and 5b. Therefore, it is possible to perform fast image processing on a series of captured images obtained by continuous image capturing and to increase the continuous image-capturing speed.

Furthermore, in the camera system 1A, the correction-processed RAW image data, together with the image capturing order information, is selectively output from the front engine 4 to the back engines 5a and 5b and also, when the compressed image data in a JPEG format, which is generated by the back engines 5a and 5b, is to be transferred to the front engine 4, on the basis of the image capturing order information, the RAW image data is transferred to the front engine 4 and is recorded on the recording medium 9 in the image capturing order. As a result, even when parallel image processing for each captured image is to be performed by the plurality of back engines 5a and 5b, images can be correctly recorded in the image capturing order.

Furthermore, in the camera system 1A, the correction unit 410 for performing shading correction or the like and a recording controller 411 for recording compressed image data in a JPEG format on the recording medium 9 as shown in FIG. 4 are provided in one front engine (processing circuit) 4. Therefore, one memory in which a memory used for a correction process by the correction unit 410 and a memory used for recording an image by the recording controller 411 are used in common (more specifically, the DRAM 4b) needs only to be provided, and the cost can be reduced.

Furthermore, in the camera system 1A, the back engine 5a has the CPU 50 as shown in FIG. 3, and the captured image can be directly output to the LCD 311 via the LCD driver 55 by using the CPU 50. Therefore, for example, an image display, such as an afterview display, can be performed quickly. Here, in the back engine 5a having a function of displaying an image onto the LCD 311, image processing for an odd-numbered image is performed. When a plurality of captured images are obtained by continuous image capturing, the processing of the final captured image, which is an even-numbered image, is exceptionally performed by the back engine 5a. As a result, even when a plurality of captured images are obtained, it is possible to quickly perform an afterview display. If the LCD driver 55 is provided also in the back engine 5b in order to be capable of displaying an image on the LCD 311, even in the case that a plurality of captured images are to be obtained, it is possible to allow the back engine 5b to perform the processing of the final captured image.

Second Embodiment

<Configuration of Camera System>

A camera system 1B according to a second embodiment of the present invention has an exterior configuration identical to that of the camera system 1A according to the first embodiment of the present invention shown in FIGS. 1 and 2.

Figure 9:
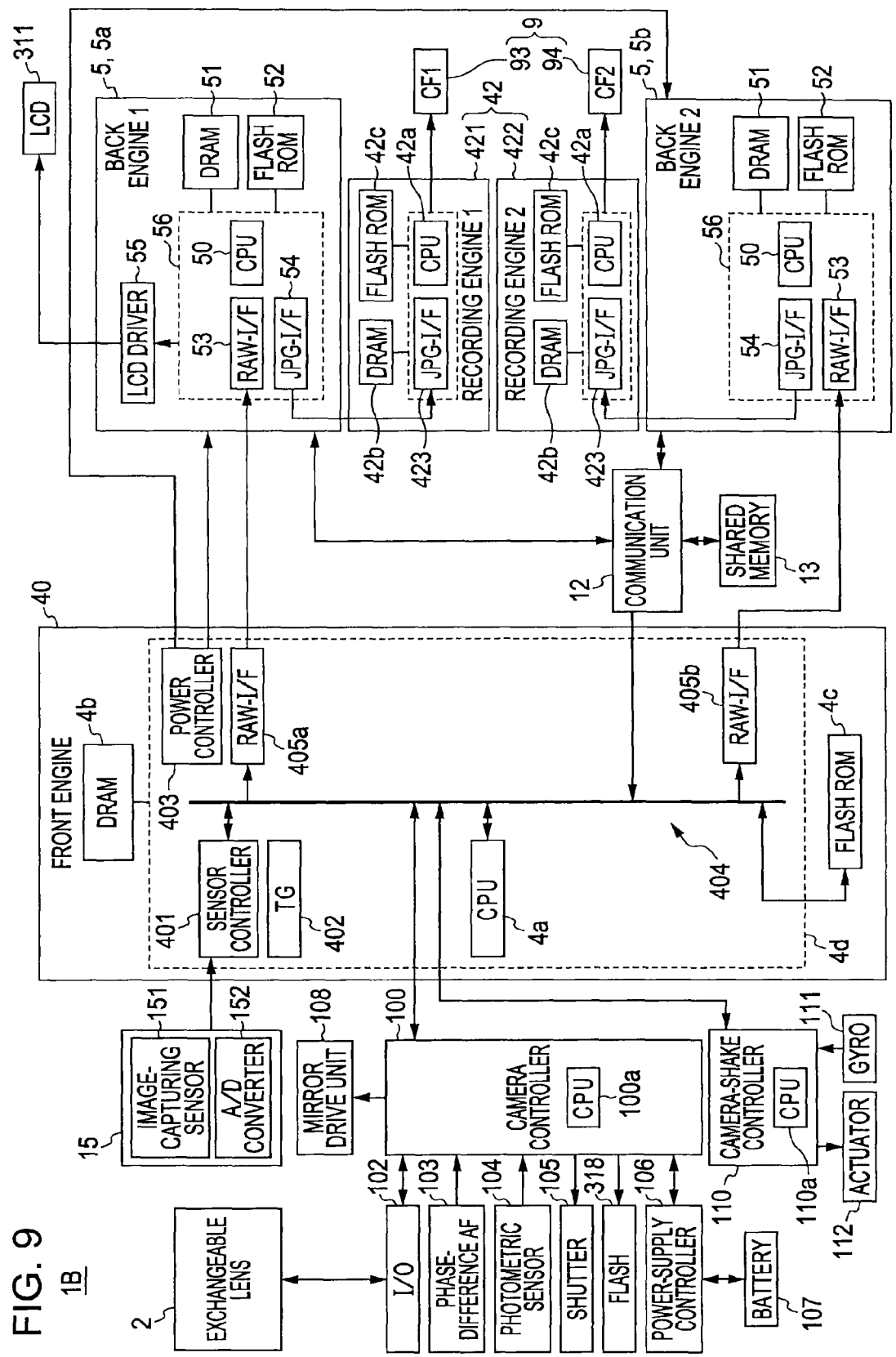
FIG. 9 is a block diagram showing the electrical configuration of a camera system 1B according to a second embodiment of the present invention.

FIG. 9 is a block diagram showing the electrical configuration of the camera system 1B. FIG. 9 corresponds to the block diagram of the first embodiment shown in FIG. 3, and components in FIG. 9, which are the same as those components shown in FIG. 3, are designated with the same reference numerals.

The camera system 1B has an electrical configuration similar to the camera system 1A of the first embodiment. However, the configuration for a process for recording compressed image data output from the back engine 5 differs.

More specifically, the main difference is that, in the camera system 1B, a recording controller 42 corresponding to the recording controller 411 (see FIGS. 4 and 5) of the front engine 4 according to the first embodiment is separated from the front engine 4 according to the first embodiment.

The recording controller 42 is configured as two recording engines 421 and 422. Each of the recording engines 421 and 422 includes a CPU 42a functioning as a microcomputer, a DRAM 42b, a flash ROM 42c, and a JPG I/F 423 for inputting the compressed image data in a JPEG format, which is output from the JPG I/F 54 of each of the back engines 5a and 5b.

The basic operations of the camera system 1B having the above-described configuration will be described below.

Figure 10:
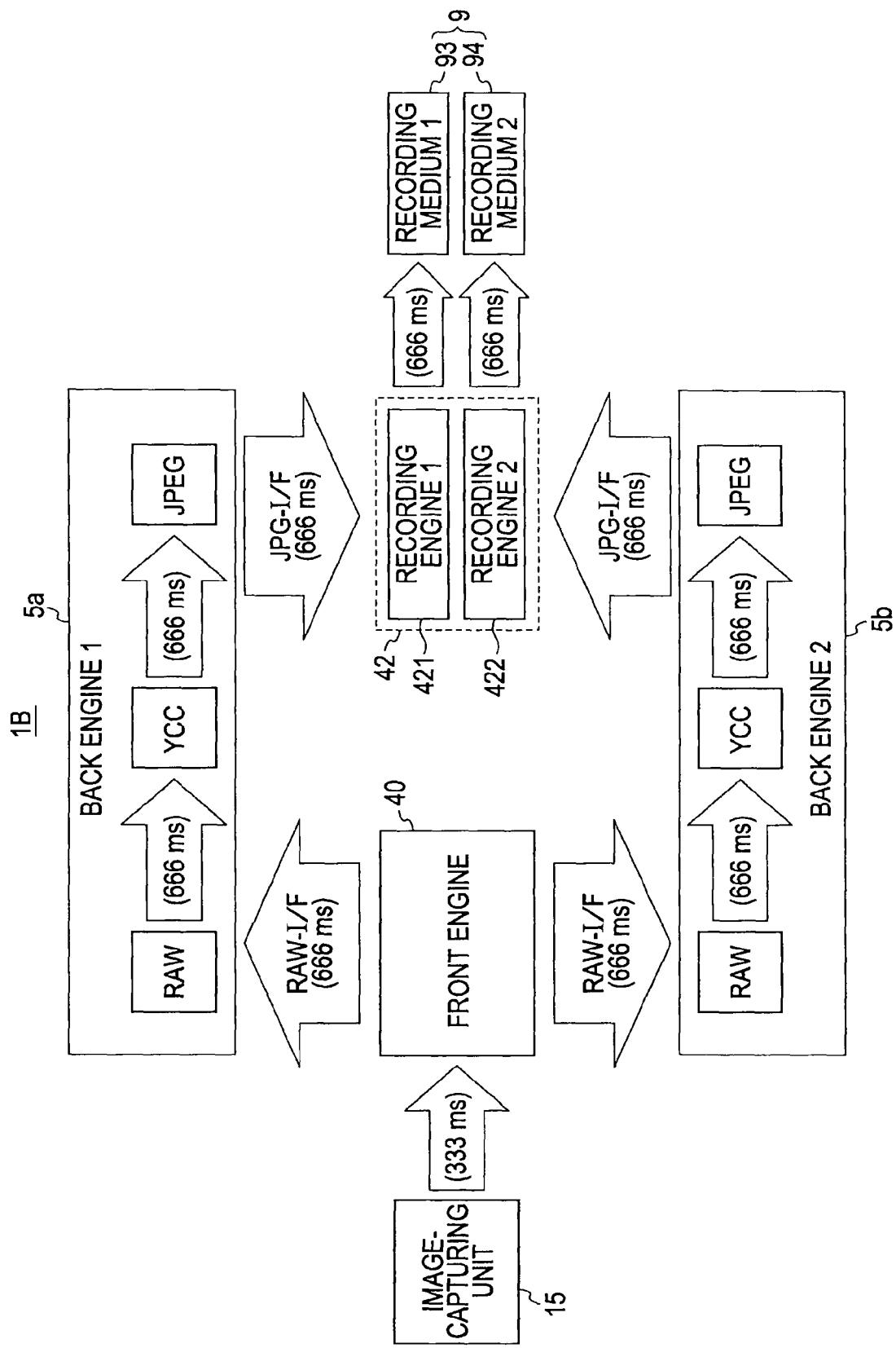
FIG. 10 illustrates basic operations of the camera system 1B.

FIG. 10 illustrates the basic operations of the camera system 1B. FIG. 10 corresponds to the operation illustration of the first embodiment.

In the camera system 1B, when continuous image capturing for 3 frames per second is to be performed, RAW image data is sequentially input into the front engine 40 at time intervals of approximately 333 ms from the image-capturing unit 15. Then, in the front engine 40, shading correction or the like is performed on the RAW image data input from the image-capturing unit 15, and the correction-processed RAW image data is transferred to separate back engines 5a and 5b with the RAW image data being separated into odd-numbered and even-numbered images. In the back engines 5a and 5b to which the correction-processed RAW image data has been transferred, a YCC conversion and a JPEG conversion are performed and also, the image data that is data-compressed by a JPEG conversion (compressed image data) is transferred to the recording controller 42 and is recorded on the recording medium 9. In more detail, the compressed image data from the back engine 5a is recorded on the recording medium 93 by the recording engine 421, whereas the compressed image data from the back engine 5b is recorded on the recording medium 94 by the recording engine 422.

As described above, in the camera system 1B, a YCC conversion and a JPEG conversion, which take a comparatively long processing time, are shared between the two back engines 5a and 5b similarly to the first embodiment. As a result, it is possible for each of the back engines 5a and 5b to perform a YCC conversion and a JPEG conversion by taking a processing time of 666 ms two times the continuous image-capturing speed of 333 ms. That is, in principle, a higher continuous image-capturing speed can be achieved on the basis of the number of back engines 5.

As a result of the above processing, it is also possible for the camera system 1B to obtain the same advantages as those in the first embodiment.

<Modifications>

In the above-described embodiments, it is not necessary to provide two back engines (image processing circuits), and three or more back engines may be provided. Here, if the number of back engines is increased, the continuous image-capturing speed can be increased further in the manner described above.

In each of the above-described embodiments, it is not necessary that the back engine 5a performs image processing on an odd-numbered captured image and the back engine 5b performs image processing on an even-numbered captured image. Alternatively, the back engine 5a may process an even-numbered captured image and the back engine 5b may process an odd-numbered captured image.

Furthermore, correction-processed RAW image data may be transferred with a higher priority to the back engine for which image processing has been completed earlier without being distributed on the basis of odd-numbered and even-numbered images. That is, the back engine that is not in the middle of processing for image processing between the two back engines 5a and 5b is detected by the front engine 4, and the correction-processed image data by the correction unit 410 (FIG. 4) is output to the back engine in an idle state. For detecting a back engine that is not in the middle of processing for image processing, for example, a busy signal transmitted from the back engine 5 while image processing is being performed may be monitored by the front engine 4, and the back engine from which the busy signal is not transmitted may be detected. As a result of the above, utilization of the back engines, which is more efficient than the case in which image processing is distributed between back engines 5 in a fixed manner according to odd-numbered and even-numbered images can be achieved.

In each of the above-described embodiments, it is not necessary that an image is displayed on the LCD 311 from the back engine 5a via the LCD driver 55, and an image may be displayed on a television set or the like from the back engine 5a via an image output terminal (for example, a Video OUT connector).

In each of the above-described embodiments, in order to efficiently use a plurality of back engines, the plurality of back engines may be used in sequence starting with the back engine in which the processing completion time takes the longest time. As a result, high-speed image processing becomes possible in the case in which, in particular, three or more back engines are used.

In each of the above-described embodiments, it is not necessary that numerical value information of 1 to 39 shown in FIG. 8 is used as identification information for identifying the image capturing order for each captured image, and time information indicating the time of image capturing for each captured image may be used. If such numerical value information and time information are used as the above-described identification information, it is possible to simply and easily record images in the image capturing order with regard to a series of captured images by continuous image capturing.

The present invention is not limited to applications to continuous image capturing for several frames per second and may be applied to, for example, continuous image capturing for a little over 10 frames per second and a continuous series of image capturing, such as moving image capturing (for example, moving image capturing by Motion JPEG). In addition, the present invention may be applied to a continuous series of image capturing, such as a plurality of times of single image capturing in which the time intervals are short.

It should be understood by those skilled in the art that various modifications, combinations, sub-combinations and alterations may occur depending on design requirements and other factors insofar as they are within the scope of the appended claims or the equivalents thereof.

What is claimed is:

1. An image-capturing apparatus comprising:
   image-capturing means for sequentially outputting image data in a RAW format related to each of captured images as a result of a continuous series of image capturing operations;
   signal processing means for performing a predetermined process on the image data in a RAW format and outputting processed image data;
   a plurality of image processing circuits for performing image processing including a luminance/color-difference conversion process and a data compression process on the processed image data and outputting compressed image data; and
   recording control means for causing compressed image data output from each of the plurality of image processing circuits to be recorded in predetermined recording means,
   wherein the signal processing means includes
      selection output means for selectively outputting the processed image data related to each of the captured images to the plurality of image processing circuits and for causing the image processing related to each of the captured images to be shared by the plurality of image processing circuits,
      said plurality of image processing circuits configured to exchange correction parameters for use in luminance/color difference processing of successive images.

2. The image-capturing apparatus according to claim 1, wherein the signal processing means and the recording control means are provided in one processing circuit.

3. The image-capturing apparatus according to claim 1, wherein each of the plurality of image processing circuits includes a central processing unit and generates header information attached to the compressed image data by using the central processing unit.

4. The image-capturing apparatus according to claim 1, wherein at least one of the plurality of image processing circuits includes a central processing unit, and can output a captured image obtained by the image-capturing means to predetermined display means by using the central processing unit.

5. The image-capturing apparatus according to claim 1, further comprising power supply control means for switching on the power supply of each of the plurality of image processing circuits when the image processing is to be started and for switching off the power supply when the image processing is completed.

6. The image-capturing apparatus according to claim 1, wherein the selection output means further comprises detection means for detecting an image processing circuit that is not in the middle of image processing among the plurality of image processing circuits; and
    means for outputting the processed image data to the image processing circuit detected by the detection means.

7. The image-capturing apparatus according to claim 1, wherein the image processing includes a correction process for performing exposure correction and/or white-balance correction on the basis of information on the correction parameters,
    each of the plurality of image processing circuits includes
    input means for inputting the processed image data related to one captured image output from the selection output means;
    obtaining means for obtaining the information on the correction parameters on the basis of the image information on the one captured image; and
    transfer means for transferring the information on a particular correction parameter that is obtained by the obtaining means, to another image processing circuit, and
    the obtaining means includes
    means for obtaining the information on the particular correction parameter on the basis of the information on the particular correction parameter based on the captured image obtained by image capturing previous to the image capturing of the one captured image, the information on the particular correction parameter being transferred from another image processing circuit by the transfer means, in the series of image capturing and on the basis of the image information on the one captured image.

8. An image processing method comprising the steps of:
    sequentially generating image data in a RAW format related to each of captured images as a result of a continuous series of image capturing operations;
    performing a predetermined process on the image data in a RAW format and generating processed image data related to each of the captured images;
    selectively inputting the processed image data related to each of the captured images to a plurality of image processing circuits and causing image processing related to each of the captured images to be shared among the plurality of image processing circuits; and
    performing image processing including a luminance/color-difference conversion process and a data compression process on the processed image data and generating compressed image data in an image processing circuit to which the processed image data has been input,
    wherein the compressed image data generated in the image processing is recorded in predetermined recording means, and
    said performing image processing includes configured to exchange correction parameters for use in the luminance/color difference conversion process of successive images.

9. An image-capturing apparatus comprising:
    an image-capturing unit configured to sequentially output image data in a RAW format related to each of captured images as a result of a continuous series of image capturing operations;
    a signal processor configured to perform a predetermined process on the image data in a RAW format and output processed image data;
    a plurality of image processing circuits configured to perform image processing including a luminance/color-difference conversion process and a data compression process on the processed image data and output compressed image data; and
    a recording controller configured to cause compressed image data output from each of the plurality of image processing circuits to be recorded in a predetermined recorder,
    wherein the signal processor includes
        a selection output unit configured to selectively output the processed image data related to each of the captured images to the plurality of image processing circuits and cause the image processing related to each of the captured images to be shared by the plurality of image processing circuits,
        said plurality of image processing circuits exchanging correction parameters for use in luminance/color difference processing of successive images.

* * * * *